Nov. 18, 1941.   G. S. ALLIN   2,263,064
CABLE POWER UNIT
Filed May 28, 1940   2 Sheets-Sheet 1

INVENTOR
GEORGE S. ALLIN
BY
Cook & Robinson
ATTORNEY

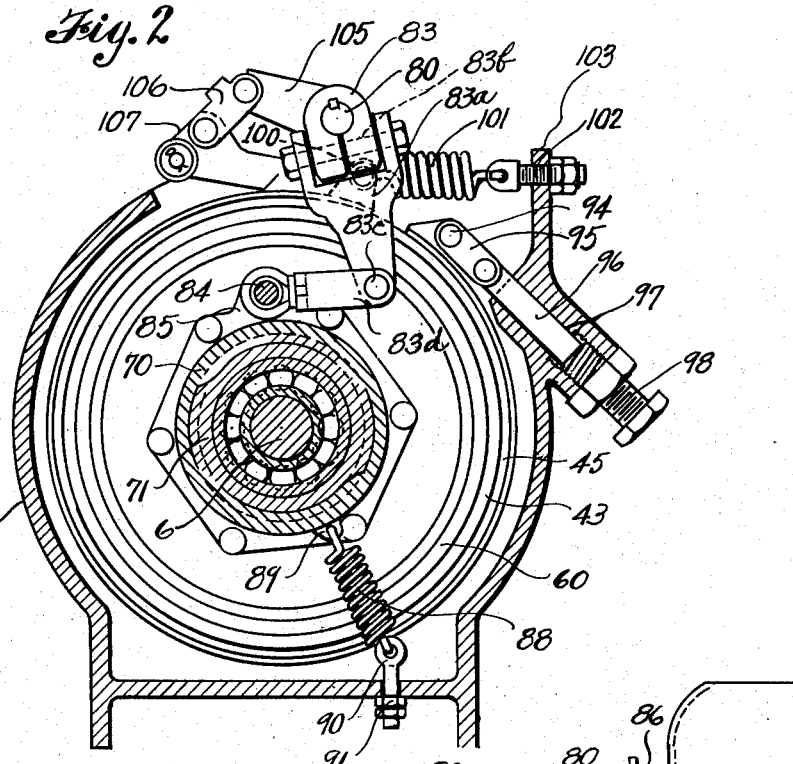
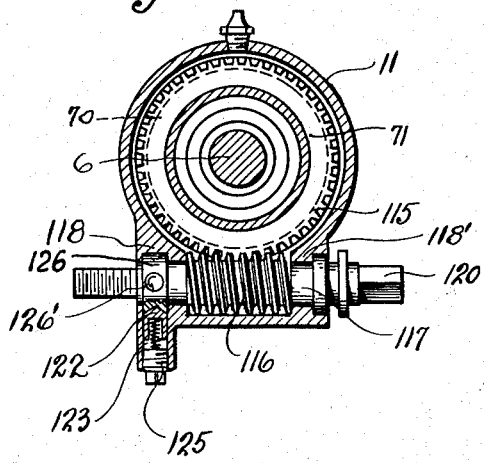
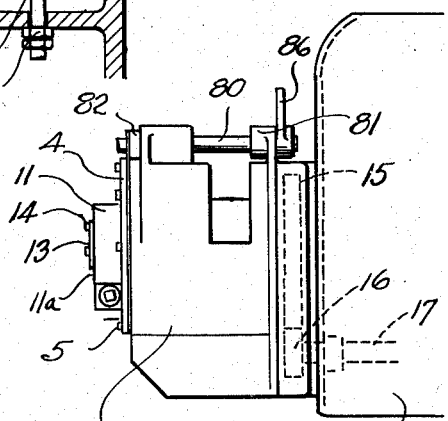

Patented Nov. 18, 1941

2,263,064

UNITED STATES PATENT OFFICE 2,263,064

CABLE POWER UNIT

George S. Allin, Seattle, Wash., assignor to Isaacson Iron Works, Seattle, Wash., a corporation of Washington Application May 28, 1940, Serial No. 337,648

9 Claims. (Cl. 192—17)

This invention relates to improvements in cable power units, or winches, particularly of that character adapted to be mounted on a tractor and to be operated under manual control by the tractor's engine, for the operation of a cable winding drum, or winch.

Explanatory to the present invention, it will here be stated that there are objectionable features, or faults common to friction driven winches, or cable winding units of this character as now generally constructed and used on tractors. One of the most objectionable faults is the failure of the various oil seals to hold over an extended period of time by reason of the deteriorating effect thereon of pressure, and of heat that is generated in the device incident to its operation; the failure of the oil seals permitting leakage of oil to places from which it drips or flows onto the friction surfaces of the clutch and brakes, with detrimental results. Also, there is the objectionable feature of a breathing action caused by the movement of the friction cone, or friction carrier, in its adjustment between "on" and "off" positions that operates to pump oil through, or past the seals with detrimental results, particularly to the holding or driving effect of the cable winding drum.

There is also, in most devices of this kind, a very disadvantageous assembly of parts that requires the dismounting or dismantling of the unit in order to give access to the parts for repair or replacement.

Therefore, it is the principal object of this invention to provide a cable winding unit embodying improved features of construction whereby these above mentioned and other common faults are overcome. Furthermore, to embody these improvements in a structure wherein all parts are easily accessible for repair or adjustment without requiring dismounting or disassembly of the unit.

Another object of the invention is to provide a novel, convenient and effective means for effecting adjustment of the clutch friction carrier to compensate for wear, and for retaining the adjustment. Furthermore, to so arrange and connect the friction adjustment levers that any adjustment made, either for the application of the clutch, or adjustment of frictions, will not cause any binding or sticking.

Still further objects of the invention reside in the details of construction of parts in this combination, and in their mode of operation, as will hereinafter be fully described.

In accomplishing these, and other objects of the invention, I have provided the improved details of construction, the preferred forms of which are illustrated in the accompanying drawings, wherein—

Fig. 2 is a cross sectional view of the same, as seen on line 2—2 in Fig. 1.

Fig. 3 is a side view of the unit shown in reduced scale.

Fig. 4 is a cross sectional detail, on the line 4—4 in Fig. 1, particularly illustrating the clutch adjusting worm.

Figures 1, 5:
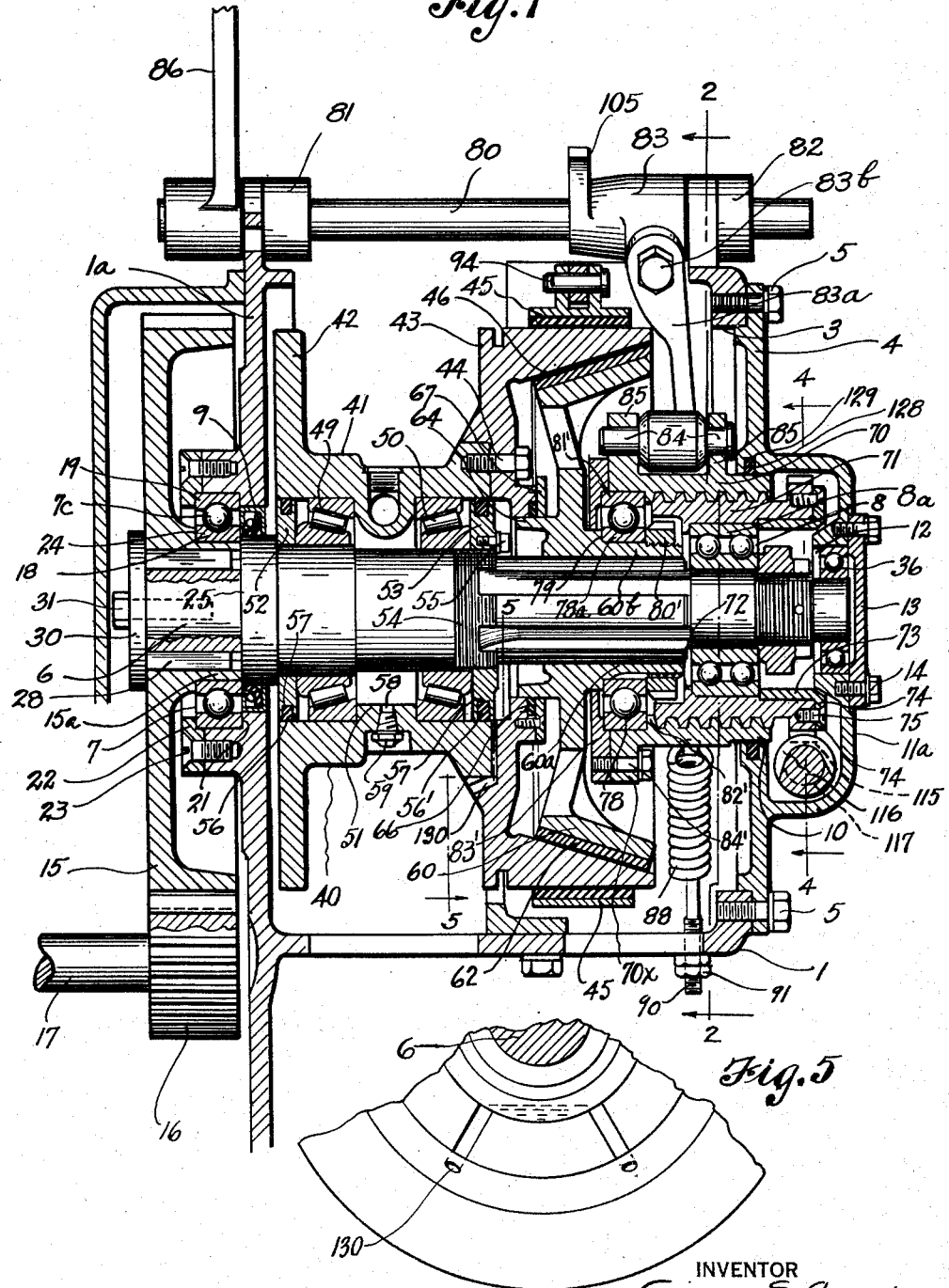
Fig. 1 is a longitudinal, vertical section of the present power unit; the section being taken in the axial plane of the winding drum.
Fig. 5 is a sectional detail on line 5—5 in Fig. 1, showing the oil drain ports.

Referring more in detail to the drawings—

In its present preferred form of construction, the power unit embodying this invention comprises a cast metal housing 1 that is adapted to be bolted, or otherwise functionally secured to a radiator, front wall, rear end, or wall of the transmission housing, of certain standard types of tractors. In Fig. 3, I have illustrated the unit as being mounted on the transmission housing 2 of a tractor. The housing 1 is substantially circular in cross section, and at what will be designated as its rear end, it has an opening 3, substantially of its full diameter, over which opening a cover plate 4 is secured by bolts 5. This plate is removable in order to give access to the mechanism contained in the housing and when it is removed, the greater part of the mechanism may be removed through the opening 3.

Contained within the housing 1 is the drum driving and clutch mounting shaft 6. This is revolubly supported at its opposite ends, respectively, through the mediacy of anti-friction bearing assemblies designated by numerals 7 and 8. The shaft 6 extends, at what may be termed its inner end, through a circular opening 9 in the base, or back wall plate 1a of the housing 1, and at its opposite end, extends through a circular opening 10 in the cover plate 4 and into a closed, cylindrical extension 11 that is integral with the cover plate 4 and surrounds the opening 10. The end wall 11a of the extension portion 11 is formed with a central opening 12, and this opening is normally closed by an overlaying cover plate 13 which is removably secured in place by a plurality of bolts 14 through its peripheral portion.

Mounted on the inner end of the shaft 6, and at the back side of the base wall 1a of the housing 1, is a driving gear wheel 15 for shaft 6, and meshing with the gear 15 is a driving pinion gear 16 mounted on a shaft 17 which may extend from, or which generally would have a driving connection, through the transmission gearing, with the engine of the tractor, not herein shown. The hub portion 15a of the gear wheel 15 extends into the opening 9 of wall 1a and has fitted thereabout the bearing assembly 7. This bearing assembly comprises an inner raceway 18, an outer raceway 19 and the ball bearings 7c contained in the raceways. The outer raceway is seated in the opening 9, and against an annular shoulder 21 therein, and is held functionally seated by an overlapping annular plate 22 that is fixed by screws 23 to the end face of a hub-like extension on wall 1a surrounding the opening. The inner raceway 18 is fitted about the gear wheel hub and seats at one end against an encircling shoulder 24 thereon, and at its other end, abuts against an annular flange 25 formed on the shaft 6. The gear wheel 15 is keyed to the end of the shaft 6 by one or more keys 28, as observed in Fig. 1, and is secured on the end of shaft 6 with the end of its hub portion seated firmly against the flange 25, by means of a plate 30 secured by bolt 31, flatly to the inner end of shaft 6, and overlapping the face of the gear about the shaft.

At its outer end, the shaft 6 is reduced in diameter and has a ball bearing assembly 36 fitted thereinto, and this is contained in the end wall opening 12 of the extension portion 11 of the cover plate 4, and is held in place by the cover plate 13.

Mounted on the shaft 6, within the housing 1, and located adjacent the base wall 1a, is the cable winding drum, or reel 40, comprising a cylindrical hub portion 41, formed with an integral, extended flange 42 at one end and having a brake drum 43 fitted about and fixed to its other end by a plurality of bolts 44. The brake drum serves as a cable retaining flange for the reel and has a brake band 45 fitted about its outer surface, and this may be applied or released, by means presently to be described, to hold the reel or to permit it to rotate.

The interior surface of the brake drum flange is conically tapered to provide a friction surface 46 with which a clutch cone, presently described, is arranged to coact for driving the cable drum or reel.

The reel 40 is mounted for free rotation on the shaft 6 by two supporting sets of roller bearings, designated at 49 and 50, adapted to be applied to the reel hub from its opposite ends. The outer raceways of these two sets of bearings are located at opposite sides of, and have their inner ends abutted against an annular shoulder 51, formed within the hub passage, and the inner raceways are held in place by rings 52 and 53 that are fitted within the hub ends; the ring 52 being seated against the encircling shoulder 25 on the shaft 6 and the ring 53 being applied to a threaded portion of the shaft, designated at 54, and held against unthreading by a lock bolt 55 that is applied through the ring and has locking contact with the shaft. Oil sealing washers 56 and 56' are contained in encircling grooves 57 in the rings 52 and 53 to prevent leakage of oil from within the reel hub, and the hub of the reel has an oiling port 58 and valve 59 for applying oil to the bearings inside the hub.

Surrounding that part of shaft 6 between the cable reel 40 and the bearing assembly 8, is the clutch cone or friction carrier 60, having its hub portion 60a splined on the shaft so as to be driven thereby while permitting certain axial adjustment as required for engaging and releasing the cone surface with the friction surface 46 of the drum 43; the cone 60 being equipped with suitable friction lining, as designated at 62, to insure holding.

The hub portion of the friction cone has an annular flange 64 at its inner end, extended into the hub portion of the drum 43 and an oil sealing gasket 66 is applied to the hub and about this flange 64 and held by an overlying ring 67 secured to the hub thus to prevent any leakage of oil to the clutch surfaces that might pass the sealing washer 56'.

Adjustment of the clutch cone or friction carrier 60 into and from driving contact with the clutch drum 43 is effected by parts shown best in Figs. 1 and 4, and including an adjustment sleeve 70 which coaxially surrounds shaft 6, and which is threaded onto a complemental adjustment sleeve 71, that is carried coaxial of shaft 6 by the anti-friction ball assembly 8, which holds the sleeve 71 against longitudinal movement; it being observed in Fig. 1 that the outer raceway 8a for this bearing assembly is held secure between an annular, inwardly extending flange 72 in the sleeve 71 and a sleeve 73 that is projected into the outer end of the sleeve 71 and has a peripheral flange 74 at its outer end overlapping the outer end of the latter sleeve end and fixed thereto by countersunk screws 75.

The inner end of the sleeve 70 contains a thrust bearing assembly 78 including an inner raceway 78a which is locked on the hub 60b of clutch cone 60 between a shoulder 79 and a lock nut 80' threaded onto the hub end, and an outer raceway 81' that is seated against a shoulder 82' in the sleeve 70 and held secure by an overlying plate 83' which, in turn, is secured to the inner end of sleeve 70 by bolts 84' extended through the end flange 70x of the sleeve and the plate, as noted in Fig. 1. The bearing assembly 78 permits free rotation of the clutch cone, or friction carrier, 60, relative to sleeve 70 without causing any relative turning or longitudinal movement of the sleeve.

With the understanding that sleeve 70 is threaded onto sleeve 71, and that the latter is normally held against rotation, it will be understood that the required shifting of the friction carrier for releasing or setting the clutch may be effected by a rotative adjustment of the sleeve 70 which will cause it to shift in its axial direction, and to move the friction carrier accordingly. This adjustment is accomplished through manually operable mechanism observed best in Fig. 2.

The sleeve rotating means comprises a shaft 80, supported across the top of housing 1 and rotatable in bearings 81 and 82 on the housing. Fixed on the shaft 80, as noted in Fig. 2, is a collar 83 on which a short, downwardly directed lever arm 83a is mounted by a pivot bolt 83b permitting the lower end of the arm to swing or to move in the axial plane of the shaft 80. At its lower end, the lever arm 83a is pivotally attached by a pivot bolt 83c, with one end of a short link 83d which, in turn, is connected by a pivot pin 84 with spaced lugs, or flanges 85—85 on the sleeve 70 between which the link is located. Also, fixed on shaft 80 is an upwardly extending lever 86 adapted for operative connection with suitable, manually controlled devices for operation and control of the clutch.

Since it is desirable that the clutch normally be "off" or released, and that it should automatically move to "off" position when the control lever is released by an operator, a coiled spring 88 is employed for this purpose. This spring is attached at one end to a lug 89 extending outwardly from the sleeve 70, and at its other end is fixed to an eye bolt 90 that is extended through the base wall of housing 1 and at its outer end is equipped with adjusting nuts 91 for effecting and maintaining a desired tension on the spring whereby it will operate to yieldably hold the sleeve 70 at such position as to normally retain the clutch in neutral or "off" position.

It is to be explained that the brake band in this instance operates automatically to grip and hold the cable drum against unwinding, or paying out the cable when the clutch is released. Also, that there is a means provided, as later described, for releasing the brake from its drum when it is desired that the cable drum be free running for paying out the cable. It will be observed by reference to Fig. 2 that, at one end, the brake band 45 is secured pivotally, as at 94, to a link 95 which, in turn, is mounted on the inner end of a slide 96 contained in a guide channel 97 in a lug cast on the housing. An adjusting bolt 98 is threaded into the lug to engage the outer end of the slide 96 to retain it at a set position of adjustment. At its other end, the brake band has connection as at 100, with a coiled spring 101 which is secured under tension to an eye-bolt 102, adjustably mounted in a flange 103 formed on the housing wall. This spring operates to exert sufficient braking tension on the brake band that it holds the cable drum against rotation in a direction for unwinding the cable. However, this brake band, by reason of the manner of its securement, has no holding effect on the brake drum when rotated or driven by the clutch in the direction for winding the cable onto the drum; this being the direction of rotation under the driving action of shaft 6.

The means for releasing the brake for paying out the cable from the drum 40 comprises the shaft 80 which is under control of the lever 86 and a short lever arm 105 fixed on the shaft 80 and connected by a toggle link mechanism 106 with a lug 107 fixed on the brake band at the end to which spring 101 is attached. The arrangement of the toggle is such that when shaft 80 is manually rotated, opposite to its direction for setting the clutch, spring 101 is extended and the tension of the brake band is released, thus releasing the cable drum for unwinding. However, when this toggling action is released, the spring 101 again applies the brake to hold the drum.

In order to adjust the normal setting of the clutch cone as may become necessary to compensate for wear on the friction surfaces, or for any other reasons, provision is made for making a rotative adjustment of the sleeve 71. It will be understood that normally the sleeve 71 is held against rotation, and therefore it operates as a fixed element on which the sleeve 70 operates through the threaded connection, to effect definite settings of the clutch. However, should the sleeve 71 be rotated while the sleeve 70 is held against rotation, then the entire clutch cone will be caused to move either toward or from the clutch drum, depending upon the direction of rotation of sleeve 71.

In order that this adjustment of the sleeve 71 may be made and retained, it is provided about its outer end, with an integral worm gear 115 and meshing therewith is a worm 116 carried on a shaft 117 that is transversely disposed in the housing 11, and revoluble in bearings 118—118', as seen in Figs. 1 and 4. This worm normally locks the sleeve against rotation, but it is provided at one end, which extends to the outside of the housing, with a wrench head 120 whereby it may be rotated, thus to effect the desired adjustment of sleeve 71. This adjustment is held by means of a spring pressed locking pawl 122 slidable in a hole 123 in the housing wall and held by a plug 125. At its inner end, the pawl is adapted to seat in V-shaped sockets 126' formed in a collar 126 on the shaft to hold the adjustment.

The worm and worm gear may be retained in a properly lubricated condition by application of oil or grease to housing 11, and in order that this oil or grease may not leak into the main housing 1, a sealing washer 128 is fitted in a groove 129 in plate 4 about the opening 10 in plate 4, and into which, the end of sleeve 70 extends. Lubrication of the bearings 8 and 78 is effected by supply from the housing 11.

In the event that the unit should be left standing idle for any considerable length of time, it is quite possible that grease or oil would seep past the washer 56', into the hub portion of the brake drum, and in order that this may not ultimately fill the hub, or rise to an extent that it could seep past the washer 66 into the clutch elements, I have provided a plurality of weep holes or drainage passages 130, leading from the interior or the hub of the brake drum to the outside of the reel hub, as shown in Figs. 1 and 5. These holes are located at such intervals about the drum that the level of oil that might be retained in the hub could not reach the height of the washer.

Assuming the device to be so constructed, it will be understood that, through the driving shaft 17 and pinion 16, the gear wheel 15 may be continuously driven. Normally, the cable drum 40 is idle and held against rotation by the brake band, but when it is desired that the cable be wound thereunto, the operator merely sets the clutch and this through linkage 106 and 107 releases the brake, thus permitting the cable drum to rotate with the shaft 6; the brake being ineffective in that direction of rotation of the drum. At the end of a cable winding operation, the clutch may be released, merely by releasing hold on the devices for actuating shaft 80, and the brake will automatically be applied by spring 101.

If it should be desired to unwind the cable from drum 40, the shaft 80 is rotated by its control lever in a direction opposite that for setting the clutch and thus causing a toggle action that releases the holding effect of the brake band, but without setting the clutch.

The particular advantages inherent in this construction reside in the easy accessibility to all parts contained inside the housing merely by removal of the cover plate 4. When this plate is removed, the entire friction carrier assembly may be slipped from the shaft 6, out through the housing opening. Likewise, the drum 40 and shaft 6 may be withdrawn upon removal of plate 30 from the shaft end.

Aside from easy accessibility to its parts, and the ease of adjustment or replacement, the arrangement of oil seals and drainage posts as herein explained adequately protects the friction surfaces and thus insures good holding qualities at all times in the clutch and brake action.

Also, the arrangement of levers and linkage through which the shaft 80 is operatively connected with the adjustment collar 70 is of importance for, by reason of the swinging action of lever 83a on bolt 83b, and the pivoted action of the link 83d in its connection at its ends with the lever 83a and collar 70, the longitudinal and rotary adjustment of the collar 70 either for application of the clutch, or for any adjustment made to compensate for wear, may take place without any binding or sticking of parts.

Having thus described my invention, what I claim as new therein and desire to secure by Letters Patent is—

1. A power unit comprising a revolubly mounted shaft, means for driving the shaft in one direction, a brake drum revoluble on the shaft, and formed with a friction surface, a brake band applied to the brake drum to normally retain it against turning, a clutch cone slidably keyed on the shaft to rotate therewith, a threaded sleeve mounted coaxial of the shaft and held in its mounting against rotation and longitudinal shifting, a collar threaded onto the sleeve, means for rotating the collar in opposite directions, thereby to cause it to shift in opposite directions along the shaft, and means connecting the collar and clutch cone whereby the latter will be shifted with the shifting of the collar into and from driving contact with said friction surface.

2. A power unit comprising a revolubly mounted shaft, means for driving the shaft in one direction, a brake drum revoluble on the shaft, and formed with a friction surface, a brake band applied to the brake drum to normally retain it against turning, a clutch cone slidably keyed on the shaft to rotate therewith, a threaded sleeve mounted coaxial of the shaft and held in its mounting against rotation and longitudinal shifting, a collar threaded onto the sleeve, means for rotating the collar in opposite directions, thereby to cause it to shift in opposite directions along the shaft, and means connecting the collar and clutch cone whereby the latter will be shifted with the shifting of the collar into and from driving contact with said friction surface, and means operable incident to rotation of the collar beyond the normal extent for declutching, to effect the release of the brake band to free the drum.

3. A power unit comprising a revolubly mounted shaft, a driving clutch element revoluble on the shaft, a clutch head slidably keyed on the shaft to rotate therewith and movable into and from driving contact with the said clutch element of the drum, a threaded sleeve supported coaxially of the shaft, a collar threaded on the sleeve and having connection with the clutch head for shifting the latter into and from driving contact with the said clutch element, means for rotatably actuating the collar on the sleeve in different directions for shifting the clutch head into and from driving contact with the clutch element, and means for effecting a rotary adjustment of the sleeve while the collar is held for relative adjustment in setting of the clutch element and clutch head.

4. A power unit comprising a revolubly mounted shaft, means for rotating the shaft, a clutch element revoluble on the shaft having a friction surface, a clutch head slidably keyed on the shaft and movable into and from driving contact with said friction surface, a sleeve coaxial of the shaft, means mounting the sleeve on the shaft for rotation thereon and against longitudinal shifting, a collar threaded onto the sleeve and rotatably connected at one end to the clutch head for shifting the latter in accordance with the shifting of the collar incident to its rotation on the sleeve, manually operable means for rotating the collar for adjustment of the clutch head, a gear on the sleeve, a worm meshing with said gear and means for rotating the worm to effect a relative adjustment in setting of the sleeve and collar.

5. A power unit comprising a housing, a drive shaft revolubly mounted therein, means for driving the shaft in one direction, a clutch element revolubly mounted on the shaft, and formed with a brake drum, and an internal friction clutch cone, a clutch cone keyed on the shaft for rotation therewith and shiftable into and from driving contact with said internal friction cone, a brake band applied to the brake drum, and normally retaining the drum against unwinding, a sleeve surrounding the shaft, means mounting the sleeve for rotation and against longitudinal shifting on the shaft, a collar threaded onto the sleeve and having rotatable connection with the hub of the clutch cone, yieldable means normally retaining the collar at such position of rotation as to hold the clutch disengaged, manual means for effecting rotation of the collar on the sleeve to set the clutch, and means operable by an adjustment of the collar beyond its declutching position, to release the brake.

6. A device as in claim 5 wherein means is provided for an independent rotative adjustment of the sleeve while the collar is held against rotation, to effect a readjustment of the clutch elements.

7. In a power unit, a driven shaft, a clutch element revoluble on the shaft, a clutch head slidably keyed on the shaft to engage the element to cause it to rotate with the shaft, a sleeve mounted for rotatable adjustment coaxial of the shaft, a collar threaded on the sleeve and connected with the clutch head for shifting it, means for rotating the sleeve for functionally actuating the clutch, a gear encircling the sleeve, a worm engaging the gear, a shaft for rotating the worm, and means for locking the shaft against rotation.

8. A power unit comprising a revolubly driven shaft, a clutch element revolubly mounted on the shaft, a complemental clutch element slidably mounted on the shaft to be driven thereby, a threaded element normally held against rotation, a collar threaded onto the said element and adapted for longitudinal adjustment thereon incident to rotation and having connection with the said complemental clutch element on the driven shaft for shifting it into and from contact with the first mentioned clutch element, a rotatably mounted control shaft parallel with the direction of shifting of the clutch element, a lever arm mounted on the shaft and a link connecting the end of the lever arm with the collar whereby rotation of the control shaft will effect rotary adjustments of the collar; said lever arm having a swinging mounting on the control shaft permitting lateral movements in accordance with the longitudinal movements of the collar.

9. A power unit comprising a housing, a shaft revolubly mounted therein, means for driving the shaft, a clutch element revoluble on the shaft, a complemental clutch element slidably keyed on the shaft to rotate therewith, a threaded sleeve mounted coaxial of the shaft, a collar threaded onto the sleeve, means connecting the collar with the clutch element on the driven shaft whereby to shift the said element with the shifting of the collar into and from driving contact with the first mentioned clutch element, a control shaft rotatably mounted in the housing, parallel with the driven shaft, a lever arm extending from the control link pivotally connected at its ends with said lever arm and with said collar; said lever arm being pivotally mounted on the shaft in a manner whereby its end may move laterally to compensate for movements of the collar in shifting the clutch element, means normally retaining the sleeve against rotation and whereby it may be rotatively adjusted to effect readjustment of the clutch setting.

GEORGE S. ALLIN.